United States Patent [19]

Bratten

[11] Patent Number: 5,380,446

[45] Date of Patent: Jan. 10, 1995

[54] METHOD FOR FILTRATION OF MACHINE TOOL COOLANT

[76] Inventor: Jack R. Bratten, 5970 St. James Dr., West Bloomfield, Mich. 48322

[21] Appl. No.: 131,298

[22] Filed: Oct. 4, 1993

[51] Int. Cl.⁶ .................. B01D 36/00; F01M 1/10; F01M 11/03
[52] U.S. Cl. .................. 210/805; 210/783; 184/6.24; 409/137
[58] Field of Search ............... 210/167, 168, 171, 172, 210/805, 806, 195.1, 783, 416.5; 184/6.24; 409/131, 136, 137

[56] References Cited

U.S. PATENT DOCUMENTS

| | | | |
|---|---|---|---|
| 2,401,340 | 6/1946 | Dunmire et al. | 210/168 |
| 2,426,817 | 9/1947 | Charlton et al. | 210/168 |
| 2,430,097 | 11/1947 | Bauer | 210/168 |
| 2,895,883 | 7/1959 | Hobson | 184/6.24 |
| 3,954,611 | 5/1976 | Reedy | 210/168 |
| 4,325,663 | 4/1982 | Lee | 210/168 |
| 4,430,231 | 2/1984 | Bratten | 210/386 |
| 4,568,460 | 2/1986 | Bratten | 210/387 |
| 4,861,494 | 8/1989 | Bratten | 210/386 |
| 5,209,841 | 5/1993 | Bratten | 210/387 |
| 5,230,793 | 7/1993 | Lenhart et al. | 210/171 |
| 5,262,071 | 11/1993 | Tuck | 219/171 |

Primary Examiner—Peter A. Hruskoci
Assistant Examiner—Robert James Popovics
Attorney, Agent, or Firm—John R. Benefiel

[57] ABSTRACT

A system and method for returning coolant from a number of machines to filter units, in which contaminated coolant collected in machines sumps is drawn upwardly through draw tubes and into an overhead downwardly inclined collector header by applying a vacuum in the collector header. The draw tubes extend above the collector header and are inclined downwardly and enter the collector header to aid the flow of coolant down the collector header. The contaminated coolant is drawn through the filter units, and the filtered coolant is drawn into venturi ejectors which generate the system vacuum, emptying into a clean tank from which is supplied filtered coolant back to the machine units.

5 Claims, 2 Drawing Sheets

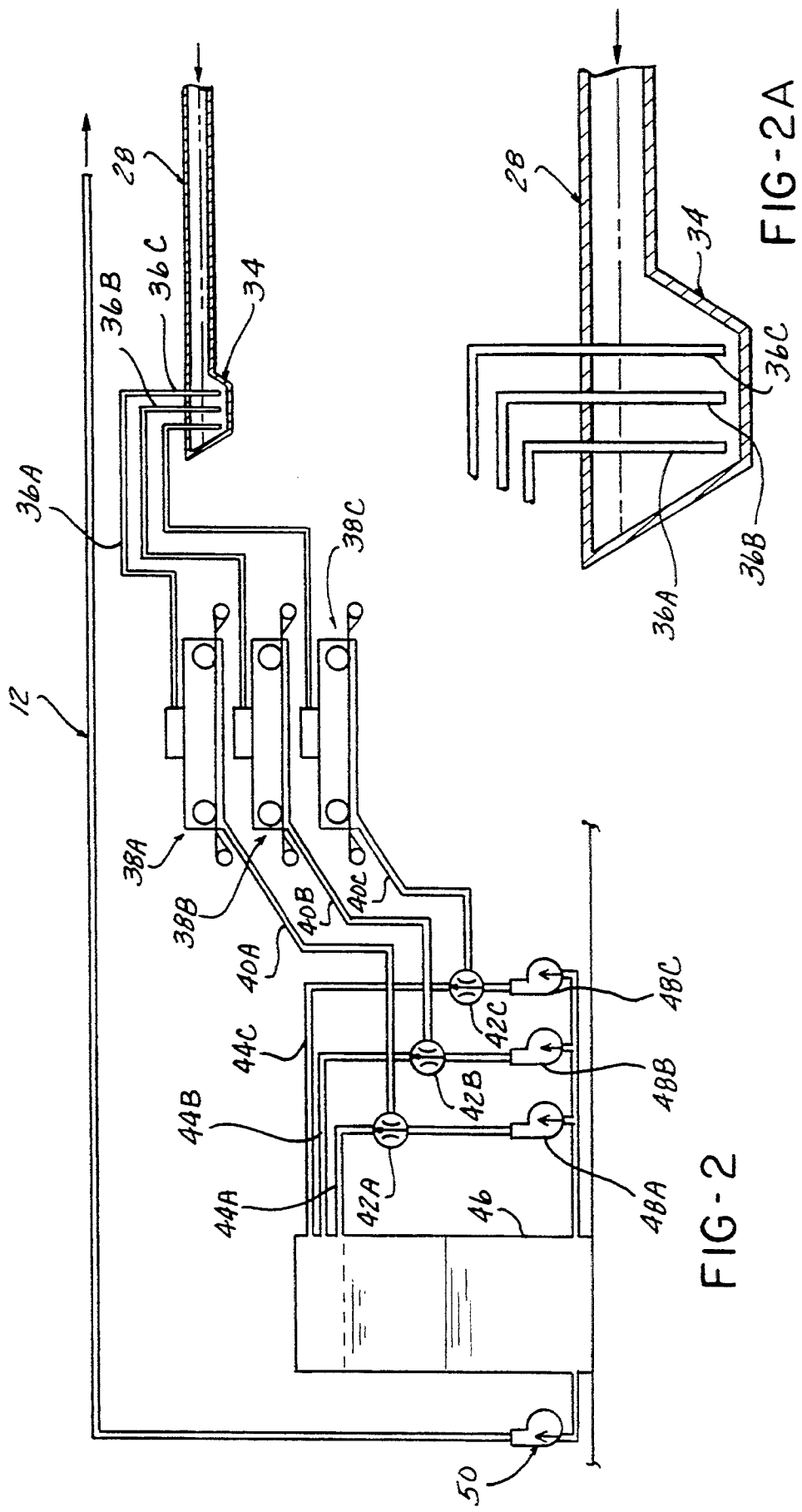

METHOD FOR FILTRATION OF MACHINE TOOL COOLANT

BACKGROUND OF THE INVENTION

This invention concerns coolant systems, and more particularly systems adapted to return collected contaminated coolant from a number of machine tools, filter the returned coolant and supply filtered coolant back to each machine tool via a supply pipe network.

Heretofore, coolant containing machining chips and other contaminants has typically been returned to a filtration unit by a below grade velocity trench, which receives coolant from each of a number of machine tools. Flow nozzles direct jets of clean coolant into the trench in a return direction to carry the chips and other solid debris along the trench to a filtration unit.

There has recently developed a trend towards above grade installations since below grade trenches, typically steel lined, can develop hard to detect leaks by the wearing action of the filtered solids scouring the surface, this leakage possibly contaminating the groundwater below.

Leak proof liners for the trenches are typically quite costly to provide so that above grade pressurized return flow coolant arrangements have been employed for returning the contaminated coolant to the filter. In these arrangements, a separate pump at each machine pumps the coolant into an overhead collection header.

This arrangement has also proved costly due to the need for a large number of pumps, one for each machine, particularly since the pump must have a design which accommodates machine chips, etc., without clogging.

It is the object of the present invention to provide an above grade coolant return system and method for a plurality of machine tools which does not require the large number of costly pumps previously required.

SUMMARY OF THE INVENTION

The present invention comprises a coolant return system and method including an overhead collector header in which a vacuum is induced to draw contaminated coolant into the header from a number of collection points.

At each collection point, a vertical draw tube extends into a level controlled coolant sump receiving contaminated coolant from a respective machine. Each draw tube extends upwardly to the same height as all the other vertical draw tubes, and then extends downwardly at an inclination into the collector header, such as to direct coolant into the collector header so as to add forward flow momentum to the coolant flowing therein. This assists the downward flow of coolant along the collector header. The collector header is itself downwardly inclined to create a "velocity" trench effect, carrying the suspended solids with the coolant flow.

The collector header is sized so as to be only partially filled to allow a higher flow velocity without excessive losses. Coolant flow in the collector header passes into a distribution bowl, defining a cavity receiving the coolant flow.

A series of suction tubes extends downwardly into the distribution bowl to a point in the cavity lying below the bottom of the collector header and is connected with a respective one of a plurality of filter units used to filter the contaminated coolant. The arrangement of the cavity and suction tubes avoids evacuation of the air in the collector header.

Flow into the collector header and filter units is caused by an induced vacuum developed by a series of ejectors, each ejector associated with recirculation loop, a pump drawing clean liquid from a clean tank and recirculating the same through the loop and back into the clean tank, with the filtered coolant drawn into the ejector by the vacuum developed by flow through a venturi passage in the ejector.

The filtered coolant is pumped from the clean tank by a main pump, and directed into a main supply passage network supplying each machine with a flow of filtered coolant.

DESCRIPTION OF THE DRAWINGS

FIG. 2 is a diagrammatic representation of the remaining portion of the coolant collection system together with the filter units, clean tank and filtered coolant supply components.

FIG. 2A is an enlarged detail of the distribution bowl and fragmentary portions of the associated collector header and suction tubes.

DETAILED DESCRIPTION

Figure 1:
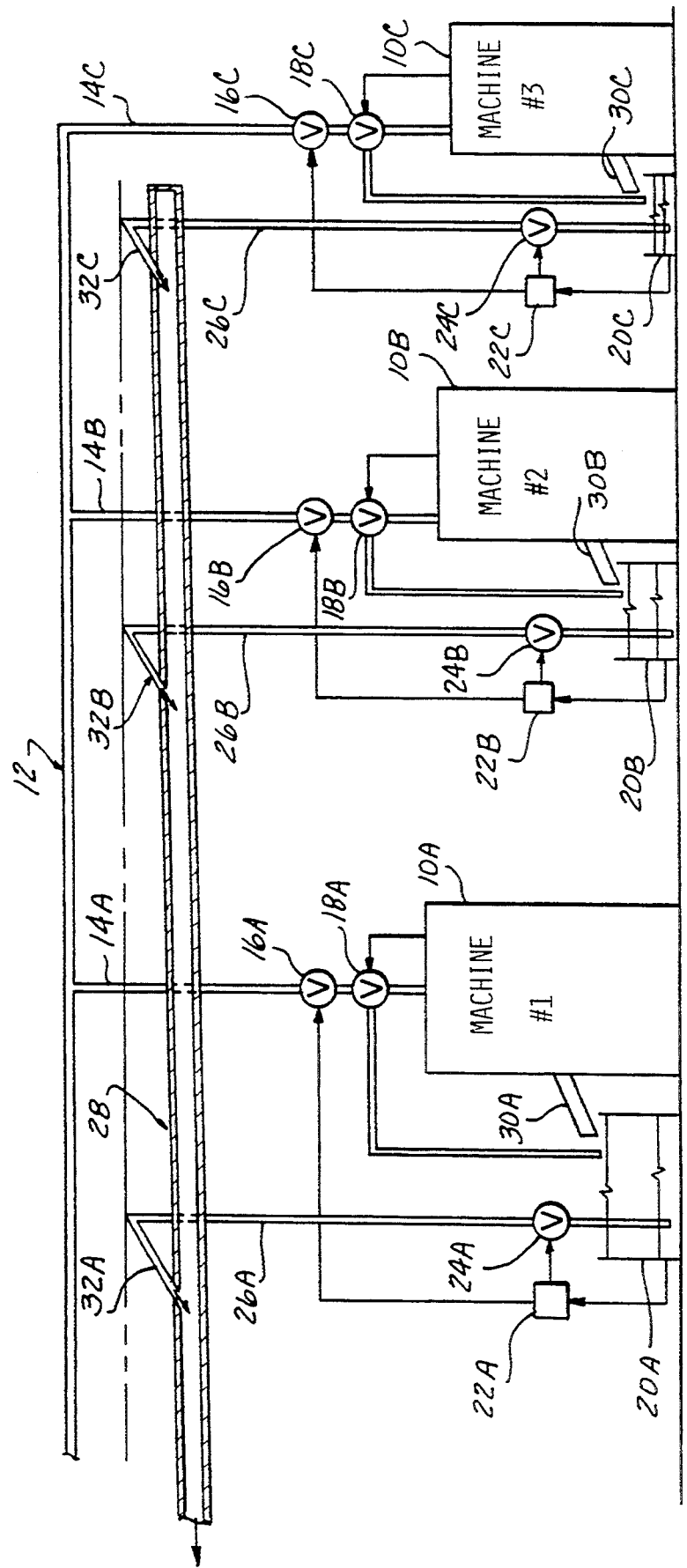
FIG. 1 is a diagrammatic representation of a series of machine tools and a portion of the coolant collection system according to the invention.

In the following specification, a particular embodiment will be described in accordance with the requirements of 35 USC 112 and particular terminology employed for the sake of clarity. However, it is to be understood that the invention is not limited and is capable of taking many forms and variations within the scope of the appended claims.

Referring to FIG. 1, the collection system is associated with a series of machines 10A, 10B, 10C, diagrammatically depicted as of varying size as to require different volumes of coolant flow. It should be understood that the system is intended to be used with any number of such machines requiring a supply of clean coolant received from a supply network including coolant supply main header 12 and branch supply pipes 14A, 14B, 14C.

Each branch supply pipe 14A–14C includes a shut off valve 16A, 16B, 16C respectively. Also included is a three way diverter valve 18A, 18B, 18C which controls the inflow of coolant to the respective machining 10A–10C. Each diverter valve 18A–18C directs a greater or lesser proportion of the inflow of clean coolant to a machine coolant sump 20A, 20B, 20C.

Depending on the coolant demand of the machine 10A–10C, a control signal is generated as indicated to operate the respective diverter valve 18A–18C. In the event a demand for coolant in a particular machine 10A–10C declines, a greater volume of the clean coolant flow is directed into a respective sump 20A–20C via the respective diverter valves 18A–18C in order to maintain an active inflow and outflow from the respective sumps 20A–20C. This continuous flow prevents settling out of the chips, etc. and also to provide a continuous flow to clean the sumps 20A–20C, all in the manner well known to those skilled in the art.

Each of the machine sumps 20A–20C has an associated level control 22A, 22B, 22C which also generates control signal such as to shut off valve 16A–16C in the event of reaching a maximum high level in the respective sump 20 or closing a shut off ball valve 24A, 24B, 24C, which are installed in respective collection draw tubes 26A, 26B, 26C, each extending to the lower level of the respective sump 20A–20C. The shut off valves 24A–24C are preferably ball type to avoid clogging with chips and to minimize pressure losses.

All of the draw tubes 26A–26C extend upwardly to the same height and are inclined at an angle downwardly to direct flow into a collector header 28 extending overhead above the machines 10A–10C and which is also inclined downwardly by a shallower angle towards the left as seen in FIG. 1. The collector header 28 is inclined at a relatively shallow inclination, such as $\frac{1}{8}$ inch per foot slope.

The draw tubes 26A–26C withdraw the contaminated liquid passing out of the respective machine 10A–10C through coolant collection spouts 30A–30C, which direct the used coolant into the respective sumps 20A–20C.

Each draw tube 26A–26C is sized to accommodate the designed for coolant return flow from the particular machine. Upward flow therein is induced by means of a vacuum established in the collector header 28 by means to be described hereinafter.

The common height of the draw tubes 26A–26C is intended to insure even collection flow as the head to which the contaminated coolant must be drawn is the same for each machine notwithstanding the elevation of the collector header 28 at the location of the particular machine so as to create a balanced collection from each machine 10.

The downward inclination at 30 of the terminus 32A, 32B, 32C of each draw tube 26A–26C allows a part of the head of the coolant to be converted to forward fluid momentum added to that of the coolant flow occurring within the collector header 28, being directed in the same direction as the flow induced by the shallower downward inclination of the collector header 28 itself, and the vacuum applied thereto as will be described.

Referring to FIGS. 2 and 2A, the collector header 28 extends to a distribution bowl 34 which defines a cavity having a portion located below the level of the bottom of the collector header 28.

The series of suction tubes 36A, 36B, 36C enter through the top of the collector bowl 34, with the bottom ends thereof extending one to two inches below the level of the bottom of the collector header 28 such as to insure that only liquid is drawn out of the collector header 28 by the vacuum, to avoid a complete evacuation of the air in the collector header 28.

The sizing of the collector header 28 is selected such that for the designed flow rate of contaminated coolant, the collector header 28 is only partially full, i.e., one half full, such that air occupies the space above the level of the flowing contaminated coolant. This sizing allows a higher velocity of the coolant flow therein without creating excessive losses as would occur if the collector header 28 was completely full of liquid with the resulting friction losses induced by contact with the entire header wall.

A higher velocity is preferable in order to keep the solid contaminants such as the machine chips moving along with the coolant itself. The collector header 28 can be sized so that when full a coolant flow of approximately five feet per second, would be induced by the downward inclination thereof and the vacuum applied. Thus, a velocity of ten feet per second is reached when the header 28 is only half full, as contemplated.

The distribution bowl 34 allows coolant flow to any one of a plurality of filter units 38A, 38B, 38C with the location of the bottom ends of the suction tubes 36A–36C being below the level of the collector 28, as noted above to insure that the air is not completely drawn out of the system and cause the collector header 28 to become completely filled with liquid to defeat the design objective described.

The filter units 38A–38C are preferably pressure filters of a type as described in U.S. Pat. No. 4,430,231 issued on Feb. 7, 1984, for a "Filter Apparatus and Method" and U.S. Pat. No. 4,568,460 issued on Feb. 4, 1986, for a "Filter Apparatus and Method". U.S. Pat. No. 5,209,841 issued on May 11, 1993, for a "Filter Belt Arrangement for Pressurized Chamber Filter" also describes such type of filter. These filters are also commercially available from Filtra Systems of Wixom, Mich. under the "VERTIPRESS" trademark. Other types of filters may also be employed.

This particular type of filter comprises a sealed chamber receiving an inflow of liquid to be filtered, passing through a filter media belt and into a collection chamber, and filtered liquid flows into outlet passages 40A, 40B, 40C respectively.

Periodically, this type of filter is cycled in order to remove filtered solids and clean the filter belt media. Such cycle may be conducted under automatic control as described in U.S. Pat. No. 4,861,494 issued on Aug. 29, 1989, for "An Automatic Cycle Control Arrangement and Method for a Pressure Filter".

The need for cleaning of the filter media belt requires periodic shut down of flow through the filter, and thus a plurality of filter units 38A–38C are employed so that only a single filter will be shut down at any given time.

The vacuum necessary to draw the contaminated coolant up into the collector header 28 and then into each of the filter units 38A–38C is produced by a series of ejectors 42A, 42B, 42C associated with recirculation loops 44A, 44B, 44C into which clean filtered liquid is drawn from a clean tank 46, and caused to flow the same back into the clean tank 46 at a higher level as indicated.

This recirculation flow is produced by respective recirculation pumps 48A, 48B, 48C.

Separate recirculation pumps are employed so that the flow to each filter unit 38A–38C is not perfectly balanced. A perfectly balanced flow would cause all of the filter units 38A–38C to go into a cleaning cycle at once if on automatic control. Simultaneous cleaning cycles would be undesirable as the coolant flow through the filters would completely cease.

The venturi of each ejector 42A–42C produces a reduced pressure from the flow of clean coolant therethrough in a well known manner, creating a vacuum in the outlet passages 40A, 40B, 40C to establish the flow of contaminated liquid into the filters 38A–38C and an outflow of clean filtered coolant through the outlets 40A–40C. The clean coolant is drawn into the recirculation loops 44A, 44B, 44C such as to be added to the volume of clean coolant contained in the clean tank 46.

A main supply pump 50 is provided drawing liquid coolant from the clean tank 46 and directing the same into the overhead supply main 12 to be redirected to the various machines in the system.

Accordingly, it can be appreciated that the system according to the present invention has eliminated the need for individual pumps associated with each machine to return the contaminated coolant to the filtration system. Only simple valving is necessary in the draw tubes associated with each machine sump.

The system is also an improvement over prior art velocity trenches which utilize a series of high pressure coolant nozzles in the trench in order to insure collection of the contaminant solids.

In such systems, a considerable flow of clean coolant is required in order to create the volume of flow necessary to provide reliable circulation of the contaminated coolant and solids to the filtration system.

In the arrangement of the present invention, such jet assist flow is not required since the flow of contaminated coolant is induced by means of the vacuum, drawing the contaminated coolant into the collection header.

Accordingly, the present invention provides a simplified return system allowing for an overhead location of the collector header without requiring individual return circulation pumps. In addition, the invention provides a reduced flow of clean coolant required to provide reliable return circulation of the contaminated liquid to the filtration system, thus reducing the demands on the filtration system employed.

I claim:

1. A method of returning contaminated coolant from a plurality machine units to at least one common filter unit comprising the steps of:

collecting the contaminated coolant in a plurality of sumps, each associated with a respective one of said plurality of machine units;

extending an overhead collector header elevated above said machine units and extending along said sumps and to said common filter unit;

connecting said overhead header collector to said common filter unit to allow coolant from said header collector to flow into said common filter unit;

connecting a draw tube from each of said sumps to said overhead collector header;

extending each of said draw tubes above said overhead collector and inclining the end thereof down and into said overhead collector header;

applying a vacuum to draw said coolant from each of said sumps up said draw tubes, and into said overhead collector header causing said coolant flow down said overhead collector header and through said common filter unit;

collecting coolant passed through said common filter unit and supplying collected filtered coolant back to said machine units.

2. The method according to claim 1 further including the step of inclining said overhead header collector downwardly in the direction of said common filter unit to cause a downward slope aiding the effect of applying said vacuum.

3. The method according to claim 2 wherein in said step of extending said draw tubes above said overhead collector header, all of said draw tubes are extended to the same height.

4. The method according to claim 1 further including the step of flowing coolant in said overhead collector header so as to only partially fill said overhead collector header.

5. The method according to claim 4 further including the step of passing said coolant in said overhead collector header into a cavity having a portion extending below the level of the bottom of said overhead collector header and extending a suction tube from each of a plurality of common filter units into said cavity portion and drawing said coolant through said suction tube into a respective one of said plurality of common filter units.

* * * * *

UNITED STATES PATENT AND TRADEMARK OFFICE
CERTIFICATE OF CORRECTION

PATENT NO.   :  5,380,446
DATED        :  January 10, 1995
INVENTOR(S)  :  Jack R. Bratten It is certified that error appears in the above-identified patent and that said Letters Patent is hereby corrected as shown below:

Claim 1, Column 5, line 25, "plurality" should be --plurality of--.

Signed and Sealed this

Eighteenth Day of April, 1995

Attest:

BRUCE LEHMAN

*Commissioner of Patents and Trademarks*

*Attesting Officer*